United States Patent [15] 3,643,260
Clarke [45] Feb. 15, 1972

[54] REMOTELY CONTROLLED FIRING CIRCUIT FOR SIMULTANEOUS FIRING OF SERIES DEVICES

[72] Inventor: Stephen Clarke, Westerham, England
[73] Assignee: International Rectifier Corporation, Los Angeles, Calif.

[22] Filed: Feb. 24, 1970
[21] Appl. No.: 13,312

[52] U.S. Cl. ....343/225, 307/252, 307/284, 325/64
[51] Int. Cl. ....H03k 17/00, H04b 1/22
[58] Field of Search ....343/225, 228, 205; 340/224, 340/171 A, 171 PP, 164; 325/390, 392, 393, 33, 54, 302, 305, 64; 307/242, 218, 252.54, 305, 252 Q, 284

[56] References Cited

UNITED STATES PATENTS

| | | | |
|---|---|---|---|
| 3,514,642 | 5/1970 | Jensen | 307/252 Q X |
| 3,497,726 | 2/1970 | Rice et al. | 307/252 L X |
| 3,267,290 | 8/1966 | Diebold | 307/252 L X |
| 3,388,269 | 6/1968 | Bertioli | 307/242 X |
| 3,398,349 | 8/1968 | Evans, Jr. et al. | 307/252 L X |
| 3,355,600 | 11/1967 | Mapham | 307/242 X |
| 2,831,126 | 4/1958 | Linvill et al. | 307/218 X |
| 2,513,342 | 7/1950 | Marshall | 340/171 PP X |
| 3,266,021 | 8/1966 | Druz et al. | 307/252 Q X |
| 3,351,769 | 11/1967 | Davis | 307/242 X |
| 3,510,687 | 5/1970 | Toulemonoe | 307/252 L |

*Primary Examiner*—John W. Caldwell
*Assistant Examiner*—Scott F. Partridge
*Attorney*—Ostrolenk, Faber, Gerb & Soffen

[57] ABSTRACT

The control electrodes of a plurality of series thyristors are connected to a radio receiver and simultaneously receive a firing impulse when a remote transmitter generates a firing signal. One or more of the devices may be arranged at high potential above ground and are provided with local power supplies for their respective control electrode circuits.

6 Claims, 3 Drawing Figures

INVENTOR.
STEPHEN CHARLES CLARKE

BY
OSTROLENK FABER GERB & SOFFEN
ATTORNEYS

REMOTELY CONTROLLED FIRING CIRCUIT FOR SIMULTANEOUS FIRING OF SERIES DEVICES

BRIEF SUMMARY OF THE INVENTION

This invention relates to firing circuits for controlled firing devices such as thyristors, and more particularly relates to the use of a respective locally connected radio receiver for firing one or more such devices when the receiver receives a given signal.

Several advantages are provided by the invention over conventional types of firing circuits. In one case, and where a large number (from 5 to 500) of series connected devices are to be fired by a "slave" firing arrangement, the devices do not fire simultaneously so that the later firing devices have an excessive forward voltage across their main terminals. With the present invention, each device is fired by the same radio signal so that it can be fired at the same instant as the others are fired.

A second main advantage of the invention is that one or more devices such as thyristors or mercury arc-controlled rectifiers are carried at a high potential above ground and can be fired by radio signals without the need for carrying control leads from a control signal source at ground potential to the devices which are at very high potential above ground. In this connection, the control power, as well as the control signal, may be locally generated. For example, control power could be taken from locally mounted photovoltaic generators illuminated by natural or artificial radiation. Alternatively, where voltage-balancing circuits are used to distribute voltage between a plurality of series-connected devices, control power can be derived from such voltage-balancing circuits.

DETAILED DESCRIPTION OF THE DRAWINGS

Figure 1:
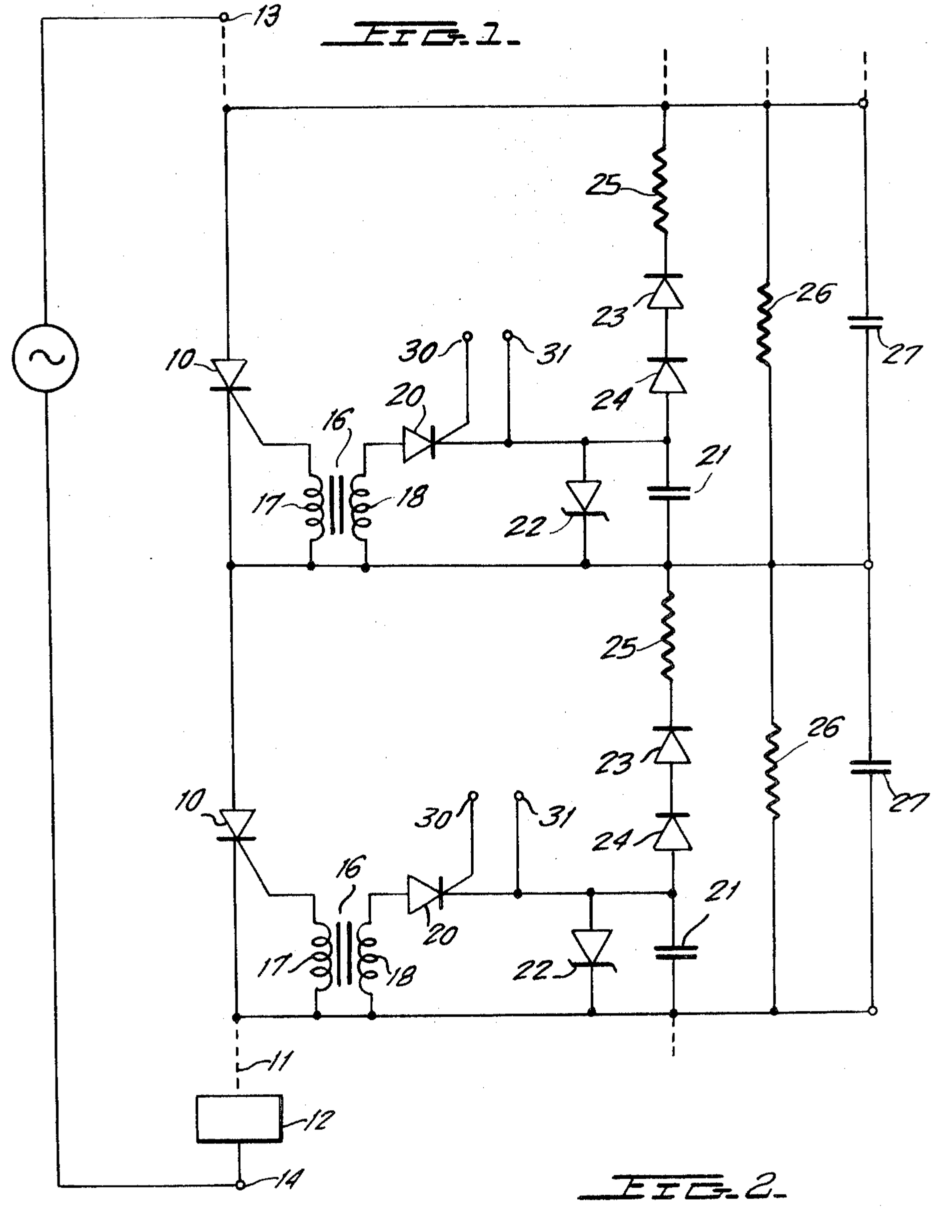
FIG. 1 is a circuit diagram of a load circuit showing two of a plurality of series-connected thyristors and their associated firing circuits.
Figure 2:
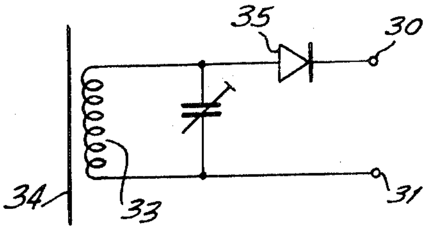
FIG. 2 is a circuit diagram of one of the radio receivers which are respectively connected to the thyristor firing circuits.

In the embodiment of FIGS. 1 and 2, an electric power control circuit includes a number of main thyristors 10, for example, anything from five to a hundred, connected in series in a load circuit 11 which also includes a load 12, load terminals 13 and 14, and is connected across an AC supply voltage 15. Thyristors 10 can be replaced by any desired type of controlled firing device having main electrodes and a control electrode. Only two of the main thyristors 10 and their associated firing circuits, less radio receivers, are shown in FIG. 1.

Each main thyristor 10 is provided with a firing circuit including a 2:1 ratio pulse transformer 16 having a secondary winding 17 connected between the gate and cathode of the main thyristor. The primary winding 18 of the pulse transformer 16 is connected in series with an auxiliary thyristor 20 across the terminals of an energizing capacitor 21 which is also shunted by a zener diode 22. The energizing capacitor 21 is also connected in series with a pair of diodes 23, 24 and a resistor 25 between the anode and cathode of the main thyristor 10. The latter are also shunted by a resistor 26 and capacitor 27 in parallel, these serving to distribute the overall potential drop between the various main thyristors 10.

The gate and cathode of each auxiliary thyristor 20 are respectively connected to the output terminals 30, 31 of a simple radio receiver whose circuit, as shown in FIG. 2, comprises a radiofrequency tuned circuit 33 coupled to an aerial 34 and connected in series with a small diode 35 to its output terminals 30, 31.

A radio transmitter (not shown) is arranged to transmit signals to the radio receivers of all the main thyristor firing circuits simultaneously so as to fire the thyristors 10 simultaneously. Thus, if the half-cycles during which the main thyristors 10 conduct are referred to as positive half-cycles, then during a previous negative half-cycle the capacitor 21 in each firing circuit will be charged through its respective diodes 23, 24 and resistor 25 to a potential that is limited by the zener diode 22. The series diodes 23, 24 will prevent capacitor 21 from being discharged during the ensuing positive half-cycle. When a radio signal is received by each receiver, the potential generated at terminals 30 and 31 will fire the auxiliary thyristor 20 and permit the capacitor 21 to discharge through the pulse transformer 16, thereby firing the main thyristors 10.

The radio transmitter may be controlled in any appropriate manner as desired. Thus, for controlling the load power from an alternating supply, the transmitter will be provided with a switching system synchronized to the frequency of the alternating supply, but having a phase angle that is adjustable in accordance with requirements to adjust the power.

The invention provides a relatively simple arrangement for firing substantially simultaneously a number of main thyristors connected in series, while preserving complete isolation of the firing circuits of the various thyristors from one another and from ground.

Figure 3:
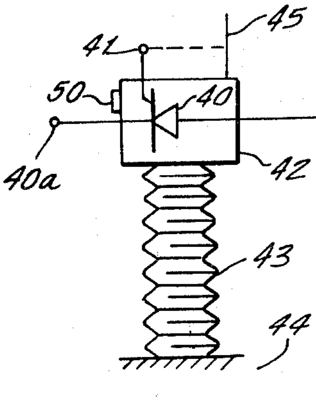
FIG. 3 shows a device mounted at high potential with respect to ground with an antenna for obtaining a firing signal from a radio transmitter located at ground.

It should be noted that the power for energizing the firing circuits, instead of being obtained from the balancing circuit resistor 26 and capacitor 27, may be obtained from locally mounted solar cells. Moreover, instead of a single radio transmitter, several transmitters using different carrier frequencies and operating simultaneously may be used to transmit firing signals to suitably modified receivers to decrease the possibility of unintentional firing by normal radio signals. The invention is also applicable to the case of a control circuit which includes one or more controlled rectifiers in series with a load circuit, and where the initiating signal is required to be at high potential, the invention giving good voltage isolation for the firing circuit. Thus, as shown in FIG. 3, a device 40 having a control lead 41 and main terminals 40*a* and 40*b* is mounted in a housing 42 mounted atop an insulator 43 from ground 44. The housing 42 may be at a high potential with respect to ground so that bringing control power and firing signals from ground 44 would require high insulation levels. In accordance with the invention, an antenna 45, suitably coupled to control electrode 41, is used to fire device 40 by signals received from a remote transmitter (not shown). Local power for the firing circuit can be obtained from the load circuit as desired, or can be taken from a solar cell 50 mounted on housing 42. Although this invention has been described with respect to its preferred embodiments, many variations and modifications will now be obvious to those skilled in the art, and it is preferred, therefore, that the scope of the invention be limited not by the specific disclosure herein, but only by the appended claims.

What is claimed is:

1. A control circuit for a plurality of series-connected controlled rectifiers; each of said controlled rectifiers having first and second main electrodes and a control electrode; said control circuit including, for each of said controlled rectifiers, trigger means and a local power source connected in series with said control electrode and one of said first and second main electrodes of the respective said controlled rectifier; said trigger means having a control electrode; a radio frequency receiver for each of said trigger means; and a single radiofrequency transmitter for radiating a common radiofrequency signal of predetermined frequency to each of said receivers; each of said receivers including an antenna, a tuned circuit and an output circuit; said output circuit of each of said receivers connected to their respective trigger means control electrode; whereby reception of said predetermined radiofrequency signal by said receivers operates each of said trigger means to a predetermined conduction condition and causes the firing of each of said series-connected controlled rectifiers.

2. The circuit of claim 1 which includes a respective parallel resistor and capacitor circuit connected in parallel with each of said controlled rectifiers; each of said local power sources including diode means and a second capacitor; each of said diode means and said second capacitor connected in circuit relation with said capacitor whereby said second capacitor is charged through said diode; each of said second capacitors being connected in series with a respective one of said trigger means.

3. The circuit of claim 1 wherein said local power source is photovoltaic cell.

4. The device of claim 1 wherein said trigger means comprises a thyristor.

5. A control circuit for a plurality of series connected controlled rectifiers; each of said controlled rectifiers having first and second main electrodes and a control electrode; said control circuit including, for each of said controlled rectifiers, trigger means and a local power source connected in series with said control electrode and one of said first and second main electrodes of the respective said controlled rectifier; said trigger means having a control electrode; and control signal means connected to each of said trigger means control electrodes; a respective parallel resistor and capacitor circuit connected in parallel with each of said controlled rectifiers; each of said local power sources including diode means and a second capacitor; each of said diode means and said second capacitor connected in circuit relation with said capacitor whereby said second capacitor is charged through said diode; each of said second capacitors being connected in series with a respective one of said trigger means.

6. A control circuit for controlling a controlled rectifier disposed at a high potential with respect to ground; said controlled rectifier having first and second main electrodes and a control electrode; an elongated insulator column supported at ground potential and having said controlled rectifier mounted on the top thereof; said control circuit including radio receiver means coupled to said control electrode for firing said controlled rectifier responsive to reception of a given radiofrequency; a trigger device having main electrodes and a trigger electrode and a local power source mounted atop said insulator column with said controlled rectifier, said trigger device, main electrodes and said local power supply connected in series with said control electrode and one of said first and second main electrodes of said controlled rectifier; said radio receiver connected to said trigger electrode; said local power source comprising a photovoltaic device.

* * * * *